(12) United States Patent
Kozuma et al.

(10) Patent No.: US 12,475,292 B2
(45) Date of Patent: Nov. 18, 2025

(54) CIRCUIT LAYOUT GENERATION SYSTEM

(71) Applicant: Semiconductor Energy Laboratory Co., Ltd., Atsugi (JP)

(72) Inventors: Munehiro Kozuma, Atsugi (JP); Minato Ito, Atsugi (JP); Yusuke Koumura, Atsugi (JP); Tatsuya Onuki, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 732 days.

(21) Appl. No.: 17/846,110

(22) Filed: Jun. 22, 2022

(65) Prior Publication Data

US 2023/0004704 A1    Jan. 5, 2023

(30) Foreign Application Priority Data

Jun. 30, 2021   (JP) .................................. 2021-108264

(51) Int. Cl.
    *G06F 30/392*    (2020.01)
(52) U.S. Cl.
    CPC .................................. *G06F 30/392* (2020.01)
(58) Field of Classification Search
    CPC ... G06F 7/57; G06F 7/60; G06F 12/06; G06F 17/16; G06F 30/398; G06F 30/392;
    (Continued)

(56) References Cited

U.S. PATENT DOCUMENTS

2012/0140550 A1*   6/2012   Endo .................... H03K 21/023
                                                      365/154
2016/0006433 A1*   1/2016   Ishizu .................. H03K 17/687
                                                      327/427

(Continued)

FOREIGN PATENT DOCUMENTS

| JP | 2012-155594 A | 8/2012 |
|---|---|---|
| WO | WO-2020/188397 | 9/2020 |
| WO | WO-2021/094873 | 5/2021 |

OTHER PUBLICATIONS

Nielsen.A et al., "Genetic circuit design automation", Science, Apr. 1, 2016, vol. 352, No. 6281, pp. aac7341-1-pp. aac7341-11.

*Primary Examiner* — Binh C Tat
(74) *Attorney, Agent, or Firm* — Eric J. Robinson; Robinson Intellectual Property Law Office, P.C.

(57) ABSTRACT

The circuit layout generation system includes a memory portion, a limitation data arithmetic portion, and a layout data arithmetic portion. The memory portion is configured to store circuit connection data and first limitation data. The circuit connection data is data regarding connection of a transistor and a capacitor included in a pixel circuit. The first limitation data includes data that determines a wiring interval of the transistor and a wiring interval of the capacitor and data that determines placement coordinates of the transistor and the capacitor. The limitation data arithmetic portion is configured to generate second limitation data on the basis of the circuit connection data and the first limitation data and store the second limitation data in the memory portion. The second limitation data is data that determines the placement of the transistor and the capacitor designated by the placement coordinates so that the transistor and the capacitor are positioned close to each other. The layout data arithmetic portion is configured to generate layout data on the basis of the circuit connection data, the first limitation data, and the second limitation data.

4 Claims, 9 Drawing Sheets

(58) Field of Classification Search
CPC .... G06F 3/04845; G06F 3/04166; G06F 3/01;
G06F 30/27; G06F 30/36; G06F 30/367;
G06F 30/394; G06F 1/3265; G06F
15/7807; H03K 19/20; H03K 3/037;
H03K 17/687; H03K 19/0008; H03K
19/0806; H01L 23/5283; H01L 23/5329
USPC .................................................. 716/118–125
See application file for complete search history.

(56) References Cited

U.S. PATENT DOCUMENTS

| | | |
|---|---|---|
| 2020/0184137 A1 | 6/2020 | Tsutsui et al. |
| 2020/0250521 A1* | 8/2020 | Ishizu .................. G06F 7/5443 |
| 2022/0147682 A1 | 5/2022 | Koumura |

* cited by examiner

CIRCUIT LAYOUT GENERATION SYSTEM

BACKGROUND OF THE INVENTION

1. Field of the Invention

One embodiment of the present invention relates to a layout data generation system regarding circuit layout (circuit arrangement).

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

2. Description of the Related Art

In logic circuit design of large scale integrated circuits (LSIs), a technology of automatically generating the circuit arrangement (also referred to as circuit layout), such as a design automation tool, has been widespread. However, a technology of automatically generating a layout of an analog circuit typified by a pixel circuit in a display device or the like has not been widespread.

In determining the circuit layout of a pixel circuit, considering layout limitations in the circuit layout is important. Examples of the layout limitations include limitation conditions for reducing variations of characteristics due to a transistor manufacturing process and limitation conditions for avoiding signal delay due to a wiring parasitic effect, capacitive coupling between nodes, or the like.

Patent Document 1 discloses a structure for automatically designing a circuit layout of an analog circuit on the basis of circuit layout limitations.

REFERENCE

Patent Document

[Patent Document 1] Japanese Published Patent Application No. 2012-155594

SUMMARY OF THE INVENTION

There are a myriad of combinations of transistors and capacitors in the circuit arrangement in a pixel circuit. Adding limitation conditions in the circuit arrangement enables data on the circuit arrangement of transistors and capacitors in the pixel circuit to be generated by limited arithmetic processing.

Depending on the circuit arrangement of the transistors and the capacitors in the pixel circuit, the parasitic capacitance of a wiring and a signal noise vary in the pixel circuit. The parasitic capacitance of a wiring, the signal noise, and the like largely affect the display quality. The optimal solution satisfying design requirements on power, signal delay, or the like in a limited area of the pixel circuit needs to be found. Thus, it is difficult to automatically generate layout data of a pixel circuit or the like by arithmetic processing with a computer or the like. Consequently, as things stand now, layout data of a pixel circuit or the like is generated by a person with past design experience.

An object of one embodiment of the present invention is to provide a circuit layout generation system which can reduce the influence on display quality. Another object of one embodiment of the present invention is to provide a circuit layout generation system which can shorten a design period. Another object of one embodiment of the present invention is to provide a circuit layout generation system which can reduced costs such as labor costs. Another object of one embodiment of the present invention is to provide a novel circuit layout generation system.

Note that the description of these objects does not preclude the existence of other objects. One embodiment of the present invention does not necessarily achieve all the objects listed above. Objects other than these can be derived from the description of the specification, the drawings, the claims, and the like.

One embodiment of the present invention is a circuit layout generation system including a memory portion, a limitation data arithmetic portion, and a layout data arithmetic portion. In the circuit layout generation system, the memory portion is configured to store circuit connection data and first limitation data, the limitation data arithmetic portion is configured to generate second limitation data on the basis of the circuit connection data and the first limitation data and store the second limitation data in the memory portion, and the layout data arithmetic portion is configured to generate layout data on the basis of the circuit connection data, the first limitation data, and the second limitation data.

One embodiment of the present invention is a circuit layout generation system including a memory portion, a limitation data arithmetic portion, and a layout data arithmetic portion. In the circuit layout generation system, the memory portion is configured to store circuit connection data and first limitation data, the circuit connection data is data regarding connection of a transistor and a capacitor included in a pixel circuit, the first limitation data includes data that determines an interval of the transistor and the capacitor, the limitation data arithmetic portion is configured to generate second limitation data on the basis of the circuit connection data and the first limitation data and store the second limitation data in the memory portion, the second limitation data is data that determines the placement of the transistor and the capacitor connected to the same wiring so that the transistor and the capacitor are positioned close to each other, and the layout data arithmetic portion is configured to generate layout data on a basis of the circuit connection data, the first limitation data, and the second limitation data.

One embodiment of the present invention is a circuit layout generation system including a memory portion, a limitation data arithmetic portion, and a layout data arithmetic portion. In the circuit layout generation system, the memory portion is configured to store circuit connection data and first limitation data, the circuit connection data is data regarding connection of a transistor and a capacitor included in a pixel circuit, the first limitation data includes data that determines an interval of the transistor and the capacitor, and data that determines placement coordinates of the transistor and the capacitor, the limitation data arithmetic portion is configured to generate second limitation data on the basis of the circuit connection data and the first limitation data and store the second limitation data in the memory portion, the second limitation data is data that determines the placement of the transistor and the capacitor designated by the placement coordinates so that the transistor and the capacitor are positioned close to each other, and the layout data arithmetic portion is configured to generate layout data on a basis of the circuit connection data, the first limitation data, and the second limitation data.

In the circuit layout generation system of one embodiment of the present invention, the pixel circuit is preferably connected to a light-emitting device.

Note that other embodiments of the present invention will be described in the following embodiment and drawings.

With one embodiment of the present invention, a circuit layout generation system which can reduce the influence on display quality can be provided. With one embodiment of the present invention, a circuit layout generation system which can shorten a design period can be provided. With one embodiment of the present invention, a circuit layout generation system which can reduced costs such as labor costs can be provided. With one embodiment of the present invention, a novel circuit layout generation system can be provided.

Note that the description of these effects does not preclude the existence of other effects. One embodiment of the present invention does not necessarily have all the effects listed above. Effects other than these can be derived from the description of the specification, the drawings, the claims, and the like.

DETAILED DESCRIPTION OF THE INVENTION

An embodiment will be described below with reference to the drawings. The embodiment can be implemented in various modes. It will be readily appreciated by those skilled in the art that modes and details can be changed in various ways without departing from the spirit and scope of the present invention. Therefore, the present invention should not be construed as being limited to the description of the embodiment below.

In the drawings, the size, the layer thickness, or the region is sometimes exaggerated for clarity. Therefore, the size, the layer thickness, or the region is not limited to the illustrated scale. Note that the drawings schematically show ideal examples, and the embodiment of the present invention is not limited to shapes or values shown in the drawings.

In this specification and the like, a metal oxide means an oxide of metal in a broad sense. Metal oxides are classified into an oxide insulator, an oxide conductor (including a transparent oxide conductor), an oxide semiconductor (also simply referred to as OS), and the like. For example, a metal oxide used in an active layer of a transistor is referred to as an oxide semiconductor in some cases. That is, an OS transistor can also be referred to as a transistor including a metal oxide or an oxide semiconductor.

An embodiment of the present invention will be described below.

A circuit layout generation system of one embodiment of the present invention can be used particularly for generating layout data of a transistor, a capacitor, and the like in a pixel circuit included in a display device. The circuit layout generation system can also be referred to as a layout data generation system for a pixel circuit.

Figure 1:
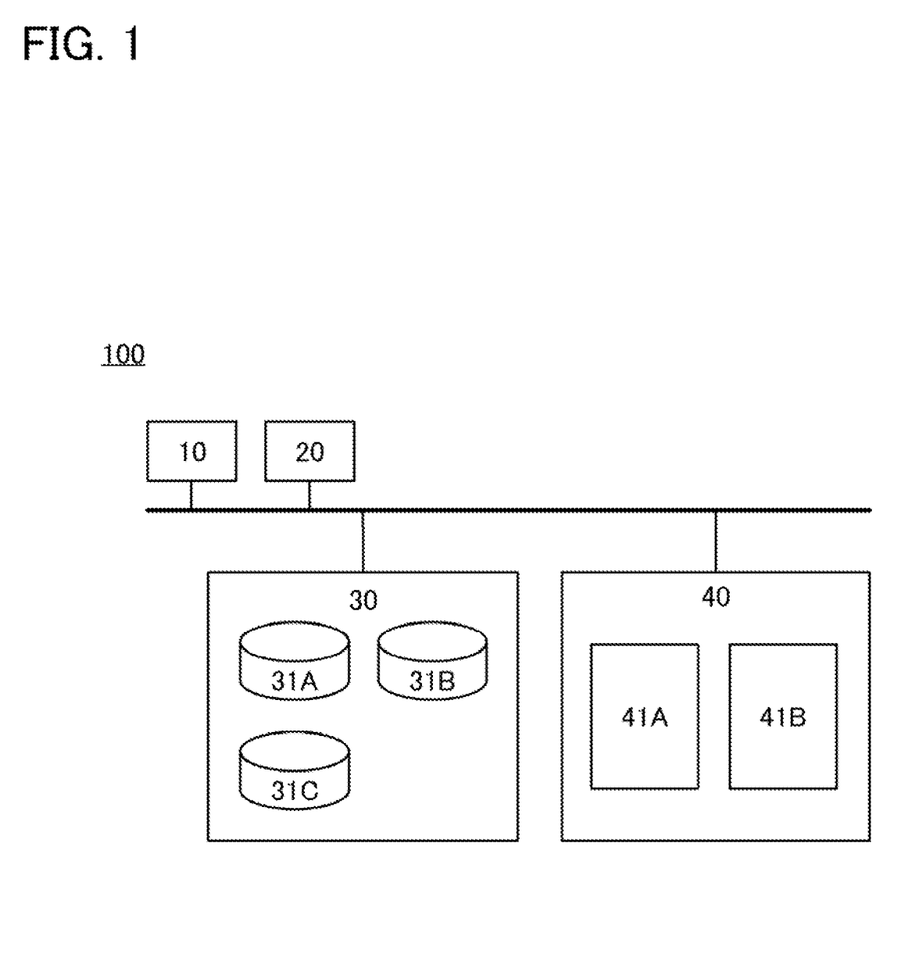
FIG. 1 is a diagram illustrating a structure example of a circuit layout generation system.

FIG. 1 is a diagram illustrating an example of a hardware structure capable of executing the circuit layout generation system of one embodiment of the present invention.

A circuit layout generation system 100 includes an input portion 10, an output portion 20, a memory portion 30, and an arithmetic portion 40.

Examples of the input portion 10 include a human interface device such as a keyboard, a mouse, or a touch panel, a camera such as a digital camera or a digital video camera, a scanner, and a read-only external memory portion such as a CD-ROM or a DVD-ROM. Alternatively, input may be performed through a communication line such as the Internet.

Examples of the output portion 20 include displays of an EL display device, a liquid crystal display device, and the like. Alternatively, output may be performed through a communication line such as the Internet.

Examples of the memory portion 30 include a read only memory (ROM), a random access memory (RAM), a solid state drive (SSD), a hard disk drive, and the like.

The memory portion 30 has a function of storing a plurality of pieces of data such as circuit connection data and limitation data. A memory region 31B that stores the circuit connection data and memory regions 31A and 31C that store the limitation data, which are described later, are illustrated in FIG. 1.

Examples of the arithmetic portion 40 include a structure provided with a plurality of arithmetic circuits such as a CPU or a GPU. The arithmetic portion 40 is capable of executing a program stored in the memory portion 30. Examples of the program include a function for generating limitation data and a function for generating layout data. The function of the arithmetic portion 40 that executes the function for generating limitation data is sometimes referred to as a limitation data arithmetic portion. The function of the arithmetic portion 40 that executes the function for generating layout data is sometimes referred to as a layout data arithmetic portion.

In FIG. 1, for the sake of later description, a limitation data arithmetic portion 41A which executes, in the arithmetic portion 40, the program for generating new limitation data on the basis of the circuit connection data and the limitation data is illustrated. In addition, for the sake of later description, a layout data arithmetic portion 41B which executes, in the arithmetic portion 40, the program for generating layout data of a pixel circuit on the basis of the circuit connection data and the plurality of pieces of limitation data is illustrated in FIG. 1.

In the circuit layout generation system 100 illustrated in FIG. 1, new limitation data is generated in the arithmetic portion 40. With this structure, the amount of data on limitation conditions stored in the memory portion 30 can be reduced. The new limitation data generated in the arithmetic portion 40 is data which excludes combinations that might produce improper layout data. The new limitation data generated in the arithmetic portion 40 can be generated on the basis of the circuit connection data and the limitation data that are previously supplied by a designer, temporarily stored in the memory portion 30, and then supplied to the arithmetic portion 40. Since the newly generated limitation data can exclude combinations that might produce improper layout data, the number of trial arithmetic operations until the optimized layout data is obtained can be reduced.

In the arithmetic portion 40 of the circuit layout generation system 100 illustrated in FIG. 1, layout data of a pixel circuit can be generated on the basis of the circuit connection data and the plurality of pieces of limitation data. Thus, the design period can be shortened compared with the case of creating layout data of the pixel circuit by human hands. Furthermore, labor costs can be reduced. Moreover, the number of trial generations of layout data can be increased, whereby the circuit performance can be optimized.

Flowcharts for generation of data on the circuit layout of a transistor, a capacitor, and the like in a pixel circuit are described. First, a flowchart for overall processing executed by the circuit layout generation system 100 is described with reference to FIG. 2.

Figure 2:
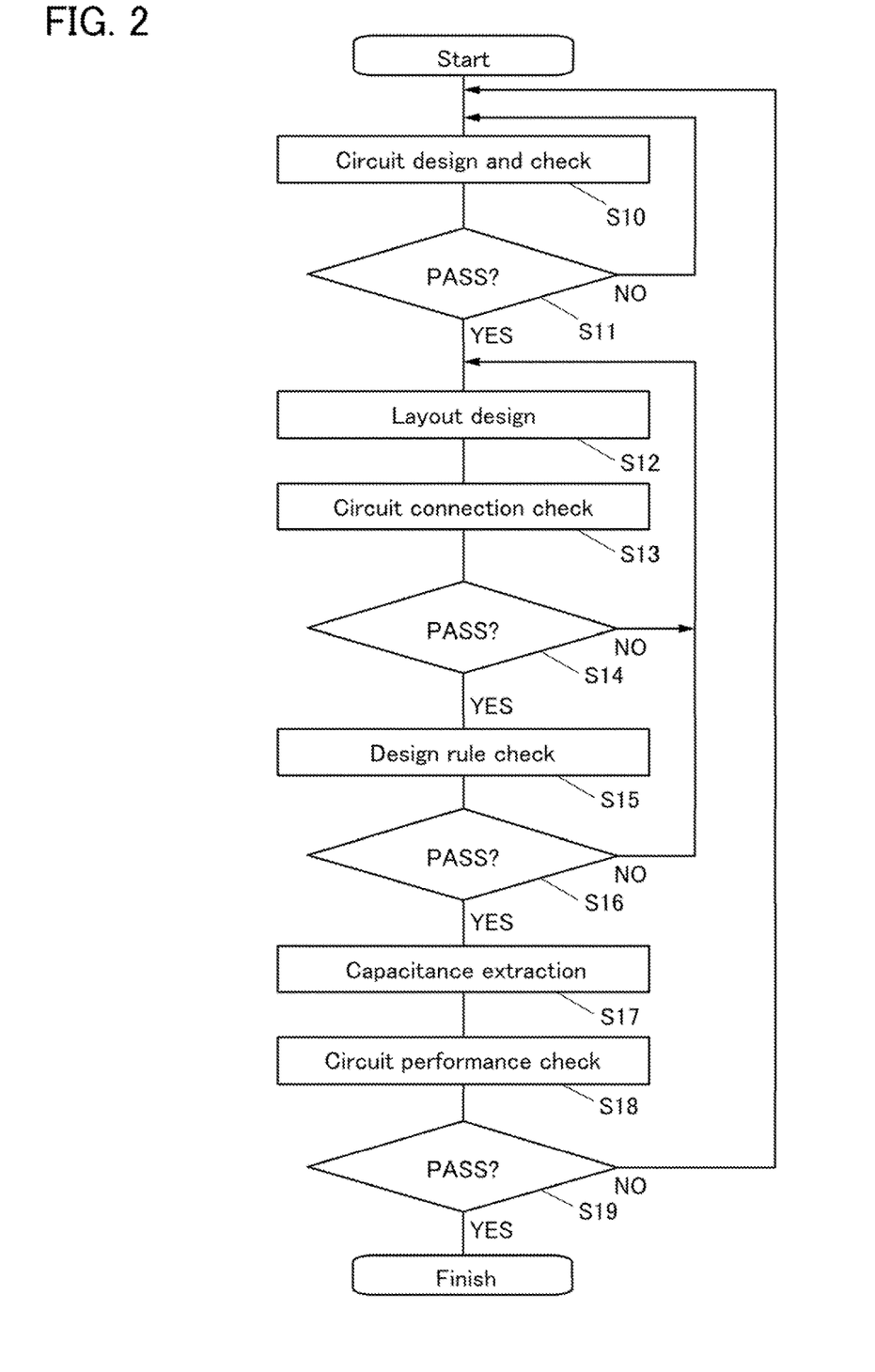
FIG. 2 is a diagram illustrating a structure example of the circuit layout generation system.

Before generation of a circuit layout, a designer (user) performs circuit design and check (Step S10). In the circuit design and check, whether a circuit operates properly is simulated, for example. In the circuit design and check in Step S10, elements such as a transistor and a capacitor necessary for a pixel circuit and wirings through which signals for driving the elements or the like are supplied are placed. The circuit design and check are evaluated on a pass/fail basis in Step S11 (PASS?).

Next, the layout is designed by the circuit layout generation system 100 (Step S12). In Step S12, layout data of the pixel circuit including the transistor, the capacitor, and the like is generated, in which reductions in the influence on display quality, a design period, or costs such as labor costs can be achieved, for example.

The layout data obtained in Step S12 is subjected to circuit connection check by the designer (Step S13). The circuit connection check checks whether the circuit designed in Step S10 and the layout data generated in Step S12 represent the same circuit. The circuit connection check is evaluated on a pass/fail basis in Step S14 (PASS?).

The layout data which has passed the circuit connection check in Step S14 is subjected to design rule check by the designer (Step S15). The design rule check checks whether the layout data generated in Step S12 satisfies a requirement of a layout pattern (e.g., wiring width or spacing between wirings) that can be formed by a semiconductor manufacturing process, which is determined by a process design kit (PDK). The design rule check is evaluated on a pass/fail basis in Step S16 (PASS?).

The layout data which has passed the design rule check in Step S16 is subjected to parasitic capacitance extraction (Step S17). The parasitic capacitance extraction calculates circuit parameters that depend on the circuit layout (e.g., wiring resistance or capacitance by an overlap in the layout pattern) from the layout data generated in Step S12.

The layout data that has undergone the parasitic capacitance extraction in Step S17 is subjected to circuit performance check by the designer (Step S18). The circuit performance check checks whether the circuit performance of a simulated circuit with the circuit parameters that depend on the circuit layout, which has been extracted in Step S16, satisfies design values required by the designer. The circuit performance check is evaluated on a pass/fail basis in Step S19 (PASS?).

Through the above-described steps, desired circuit layout data can be obtained.

Figure 3A:
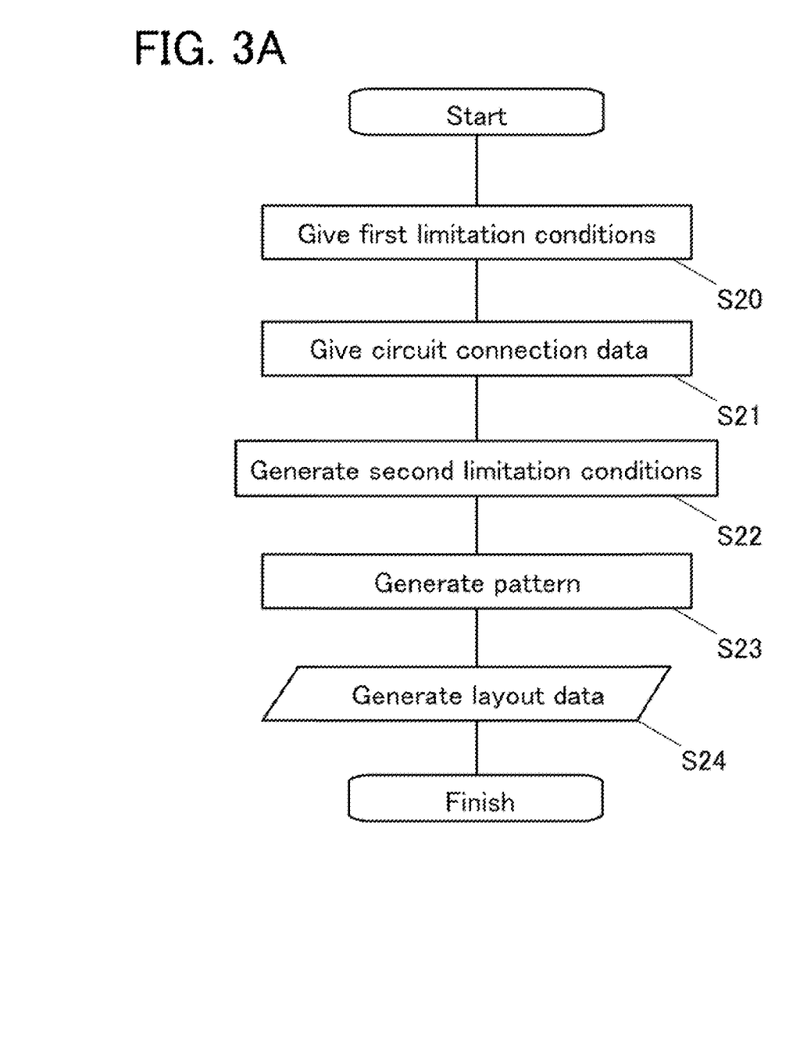
FIG. 3A and FIG. 3B are diagrams illustrating structure examples of the circuit layout generation system.

Next, usage of the circuit layout generation system of one embodiment of the present invention in the layout design shown in Step S12 in FIG. 2 is described. FIG. 3A is a flowchart showing a plurality of steps (subroutine) in generating the layout data of the transistor, the capacitor, and the like in a pixel circuit.

First, first limitation data (referred to as first limitation conditions below) stored in the memory region 31A of the memory portion 30 is read and given (input) to the limitation data arithmetic portion 41A of the arithmetic portion 40 (Step S20). Next, the circuit connection data stored in the memory region 31B of the memory portion 30 is read and given (input) to the limitation data arithmetic portion 41A of the arithmetic portion 40 (Step S21). The order of Step S20 and Step S21 may be reversed or they may be performed at the same time.

The first limitation conditions are limitation conditions that are previously given by the designer. Examples of the first limitation conditions include conditions of aligning the directions of a source and a drain of a semiconductor layer and the direction of a gate (backgate) in a transistor and evenly spacing the source, the drain, and the gate (1D layout), conditions of coordinates for limiting the placement of elements (wiring grid), conditions of serial placement (placing sources and drains in series) in the case of placing a plurality of transistors, conditions of parallel placement (placing sources and drains in parallel) in the case of placing a plurality of transistors, and conditions regarding the shape of a capacitor. The wiring grid can be rephrased as conditions for limiting coordinates where elements are placed by dividing a region where a pixel circuit is provided into a plurality of regions (e.g., in a mesh form). In the layout data of a pixel circuit generated by employing the 1D layout and the wiring grid, electric characteristics of each element can be stabilized.

The circuit connection data corresponds to information such as a netlist. The netlist is data created by the designer at the time of circuit design in Step S10 described above. The netlist contains information on the size of a transistor such as a channel length and a channel width (transistor size) and information on the connection between terminals such as a gate (backgate), a source, a drain, and the like of the transistor and electrodes of a capacitor, for example. As initial information, information that some transistors and capacitors are placed close to or apart from each other may be contained. Furthermore, information designating coordinates of the transistors and capacitors may be contained.

Figure 4A:
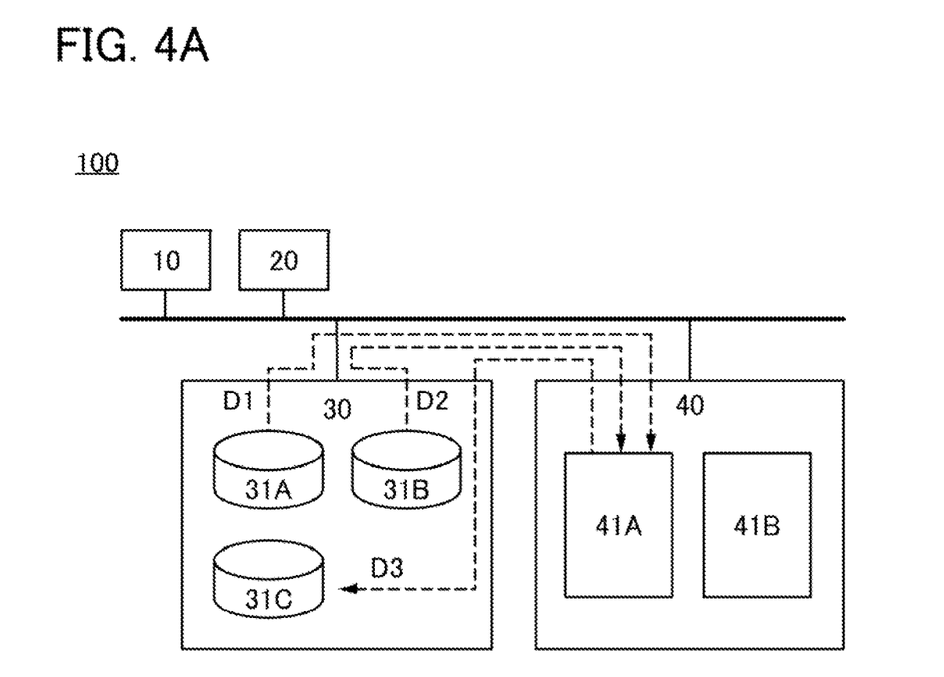
FIG. 4A and FIG. 4B are diagrams illustrating structure examples of the circuit layout generation system.

Next, second limitation data (referred to as second limitation conditions below) is generated on the basis of the first limitation conditions and the circuit connection data given to the limitation data arithmetic portion 41A of the arithmetic portion 40 (Step S22). FIG. 4A schematically illustrates the data flow in Step S20 to Step S22. In FIG. 4A, data D1 on the first limitation conditions and data D2 that is the circuit connection data are given to the limitation data arithmetic portion 41A of the arithmetic portion 40, the limitation data arithmetic portion 41A generates data D3 on the second limitation conditions, and the data D3 is stored in the memory region 31C of the memory portion 30.

The second limitation conditions are limitation conditions generated by the limitation data arithmetic portion 41A of the arithmetic portion 40. For example, the second limitation conditions are limitation conditions that designate, on the basis of the circuit connection data or the like, the coordinates for placing transistors or capacitors connected to the same wiring or terminal so that the transistors or capacitors can be close to each other.

The limitation data arithmetic portion 41A of the arithmetic portion 40 generates the second limitation conditions by taking into account the information of the circuit connection data, whereby a circuit arrangement image by the designer at the time of circuit data design can be incorporated and combinations that might produce improper layout data can be excluded. Therefore, the number of trial operations until the layout data is optimized can be reduced.

A pattern is generated on the basis of the data D1 on the first limitation conditions, the data D2 that is the circuit connection data, and the data D3 on the second limitation conditions generated in Step S22 (Step S23). If the generated pattern is normal, the pattern is output to the output portion 20 or the like as layout data (Step S24).

Figure 3B:
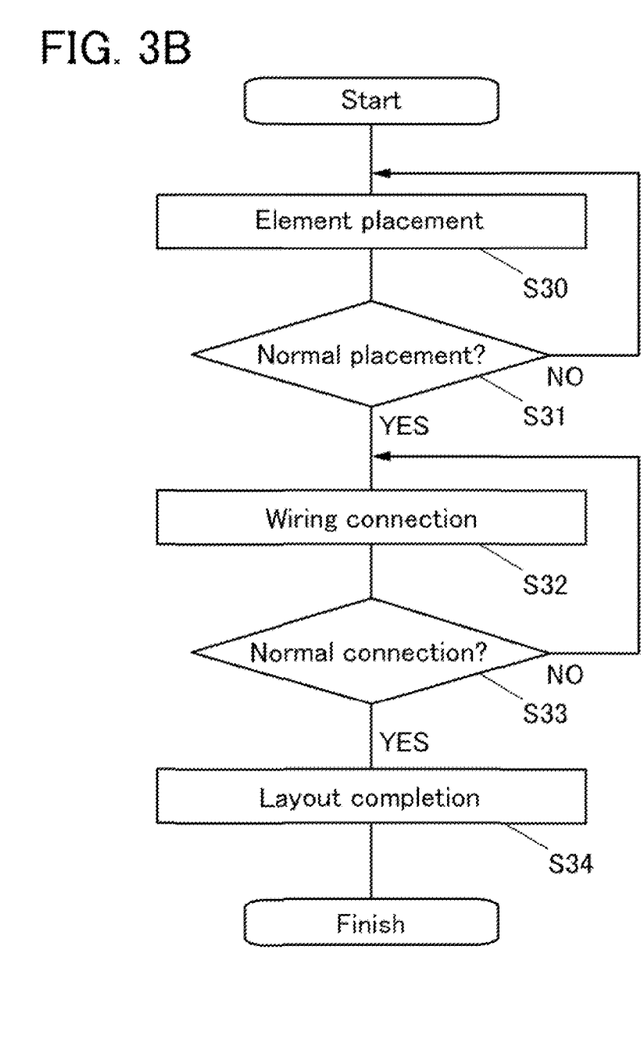

A flowchart of the pattern generation subroutine of Step S23 is shown in FIG. 3B. Elements are placed automatically (Step S30), and whether the placement is normal is judged (Step S31). Next, wirings are connected automatically (Step S32), and whether the connection is normal is judged (Step S33). If both the element placement and the wiring connection are normal, the layout data is completed and pattern generation is finished (Step S34).

The element placement is performed by a technique based on a dynamic model such as a cluster development method. Alternatively, the placement of elements such as a transistor and a capacitor can be tried using a min-cut method, a pairwise interchange method, force-directed relaxation, a Steinberg's method, or the like. The wiring connection between elements can be tried using a maze method, a line search method, a channel routing method, a genetic algorithm, or the like.

Figure 4B:
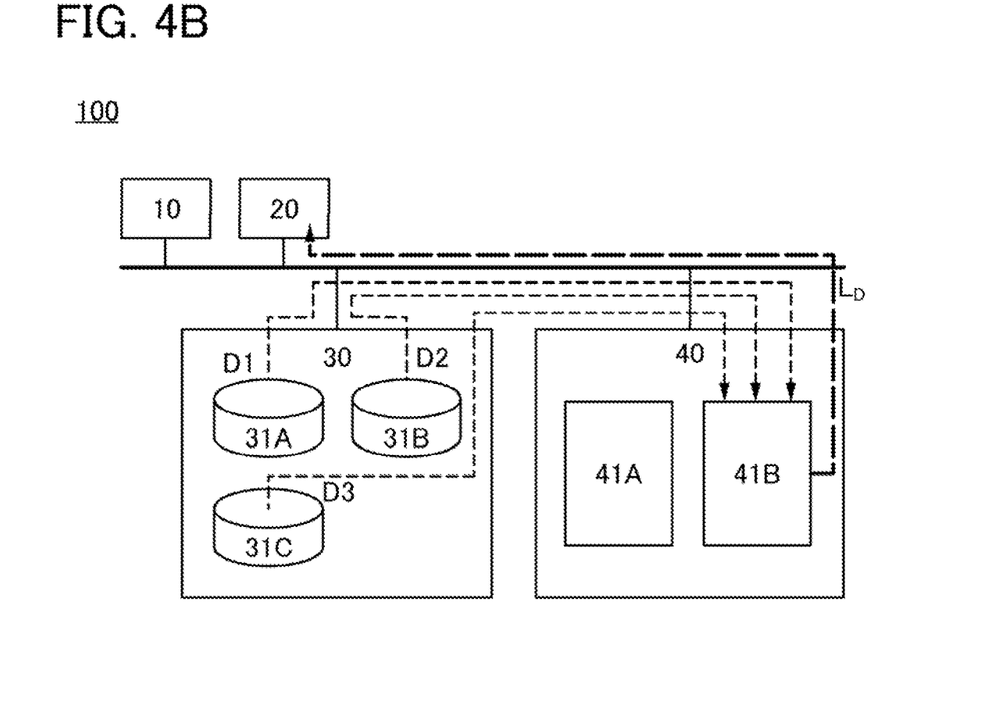

FIG. 4B schematically illustrates the flow of each data at the time of the pattern generation in Step S23. In FIG. 4B, the data D1 on the first limitation conditions, the data D2 that is the circuit connection data, and the data D3 on the second limitation conditions are given to the layout data arithmetic portion 41B of the arithmetic portion 40, the layout data arithmetic portion 41B generates layout data $L_D$, and the layout data $L_D$ is output to the output portion 20 (indicated by a bold arrow).

FIG. 5, FIGS. 6A and 6B, FIGS. 7A and 7B, FIGS. 8A and 8B, and FIGS. 9A and 9B illustrate an example of designing a pixel circuit of a display device using the circuit layout generation system of one embodiment of the present invention.

Figure 5:
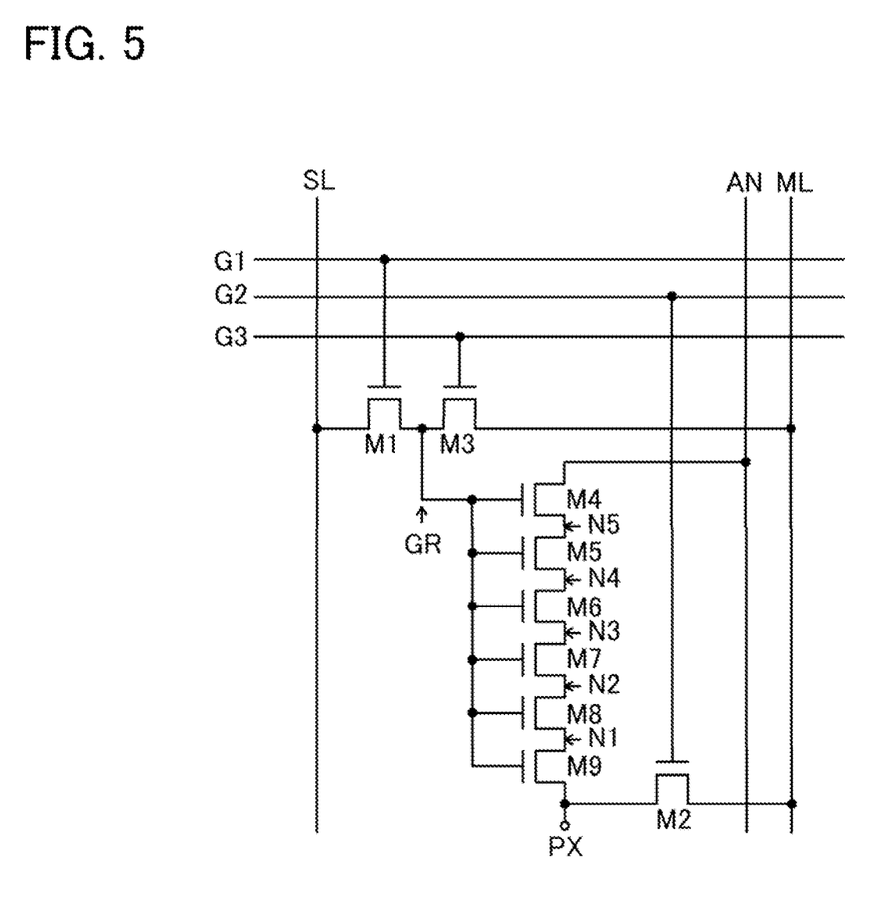
FIG. 5 is a diagram illustrating a structure example of the circuit layout generation system.

FIG. 5 is a circuit diagram of a pixel circuit for driving a light-emitting element. Illustrated in FIG. 5 are transistors M1 to M9, wirings G1 to G3, a wiring SL, a wiring AN, a wiring ML, a terminal PX, nodes N1 to N5, and a node GR. Note that the light-emitting element is not illustrated for simple description.

The wirings G1 to G3 function as gate signal lines (scan lines) through which signals that turn on or off the transistors M1 to M3 serving as switches are supplied. The wiring SL functions as a data signal line (source line or data line) through which a data signal to be given to the pixel circuit is supplied. The wiring AN functions as a current supply line for feeding a current to the light-emitting element connected to the pixel circuit. The terminal PX is a terminal to which the light-emitting element such as an organic EL element is connected. The transistors M4 to M9 function as driving transistors for feeding a current to the light-emitting element in accordance with the data signal. The wiring ML functions as an output line for externally measuring the current value of the driving transistors. The wiring ML also functions as a power supply line for setting the potential of the node GR or the terminal PX to a certain potential.

The circuit connection data corresponds to data representing connections in the pixel circuit illustrated in FIG. 5. The data can be described as data of Simulation Program with Integrated Circuit Emphasis (SPICE) or the like.

In the data representing connections in the pixel circuit illustrated in FIG. 5, information that a gate of the transistor M1 is connected to the wiring G1, that one of a source and a drain of the transistor M1 is connected to the node GR, and that the other of the source and the drain is connected to the wiring SL is described as the data of SPICE, for example. Similarly, connections between the transistors and the wirings or nodes are described as the data of SPICE.

By inserting a blank row in the data of SPICE, the data can show that wirings or transistors are placed apart from each other. Data designating the initial coordinates of a certain element may be supplied.

As the first limitation conditions, the distance between wirings, a 1D layout, a wiring grid, or the like can be supplied. Preferably, any limitation conditions regarding the global wirings with a small influence on circuit performance, such as the gate signal lines, the data signal line, the current supply line, and the power supply line, are not set. In other words, an element may be connected to any of the nodes on the global wirings.

Furthermore, the second limitation conditions that limit the placement of the transistors, which are based on the first limitation conditions and the circuit connection data described above, can be given. The second limitation conditions in the example of the pixel circuit in FIG. 5 are conditions for limiting the placement pattern of the transistors M4 to M9 that are connected to the nodes N1 to N5 and the node GR.

In the layout data derived from the first limitation conditions, the circuit connection data, and the second limitation conditions, in the case where the layout data is not provided with positional information, the placement is determined by weighting each item. With the second limitation conditions or the like, the range of the element placement can be limited and a search for the placement of elements, wirings, or the like can be made so that the position of elements can be optimized from the initial position, whereby automatic layout can be performed under local conditions. Thus, combination patterns can be reduced and automatic layout can be performed within the element placement range the designer assumes.

Figure 6A:
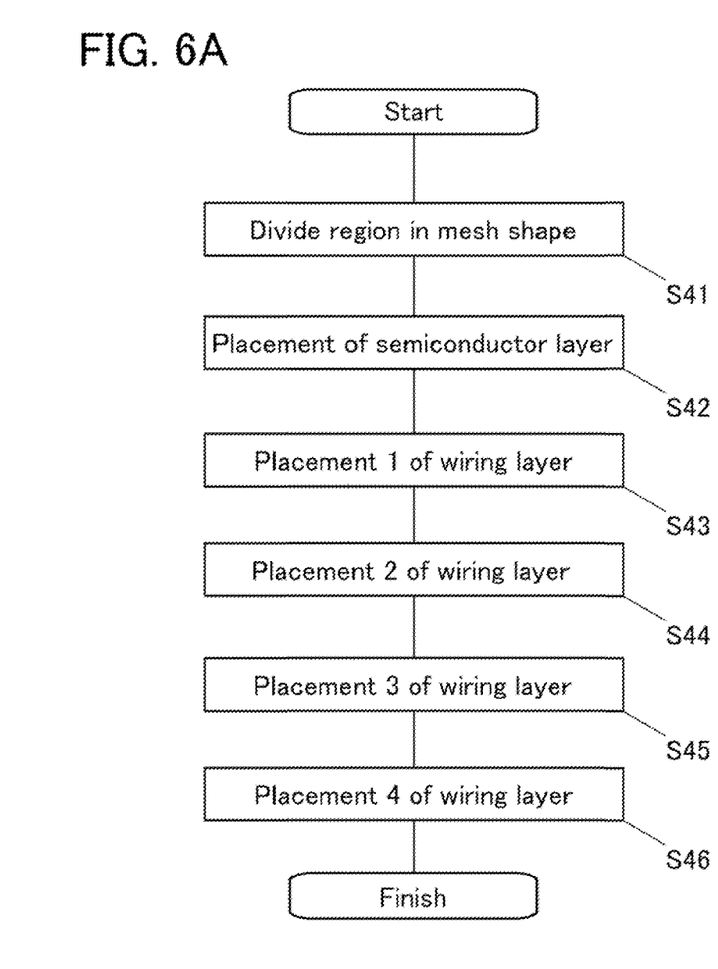
FIG. 6A and FIG. 6B are diagrams illustrating a structure example of the circuit layout generation system.

For example, the element placement and the wiring placement can be performed as illustrated in a flowchart of FIG. 6A. For example, the steps in the flowchart can be represented by Step S41 to Step S46; in this case, layout data for providing four wiring layers over a semiconductor layer can be obtained. In other words, the example described here is of the case of determining the element placement and the wiring placement of the transistors M1 to M9 with a top-gate structure.

Specifically, first, a region where the pixel circuit is to be provided is divided in a mesh form (Step S41). Next, a semiconductor layer is placed (Step S42). Then, placement 1 of a wiring layer in the same layer as a gate electrode is performed (Step S43). Then, placement 2 of a wiring layer in the same layer as a source electrode or a drain electrode is performed (Step S44). Next, placement 3 of a wiring layer is performed (Step S45). Next, placement 4 of a wiring layer in the same layer as a pixel electrode is performed (Step S46). Each of these steps is automatically carried out by the circuit layout generation system 100.

Figure 6B:
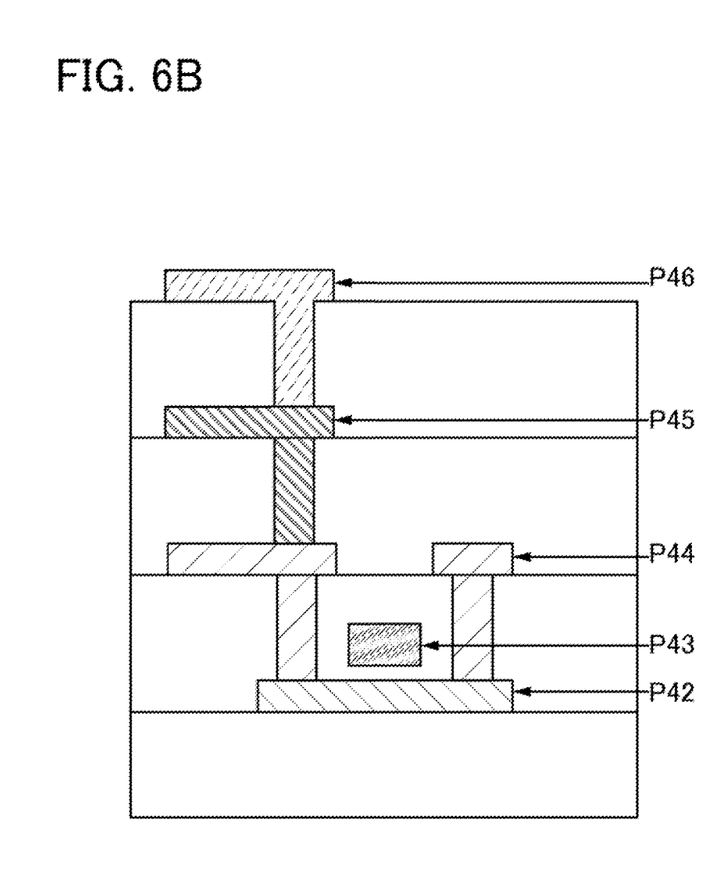

The layers placed in Step S42 to Step S46 correspond to conductive layers and a semiconductor layer of a transistor in a schematic cross-sectional diagram of FIG. 6B. For example, the semiconductor layer placed in Step S42 corresponds to a semiconductor layer P42 in the schematic cross-sectional diagram of FIG. 6B. Furthermore, the wiring layer placed in Step S43 corresponds to a conductive layer P43 in the schematic cross-sectional diagram of FIG. 6B. Furthermore, the wiring layer placed in Step S44 corresponds to a conductive layer P44 in the schematic cross-sectional diagram of FIG. 6B. Furthermore, the wiring layer placed in Step S45 corresponds to a conductive layer P45 in the schematic cross-sectional diagram of FIG. 6B. Furthermore, the wiring layer placed in Step S46 corresponds to a conductive layer P46 in the schematic cross-sectional diagram of FIG. 6B.

Schematic diagrams regarding the placement of the conductive layers and the semiconductor layer in FIG. 7A to FIG. 9B correspond to Steps S41 to S46. Note that reference numerals shown in FIG. 7B to FIG. 9B are based on the reference numerals used for the wirings, nodes, and the like included in the pixel circuit illustrated in FIG. 5.

Figure 7A:
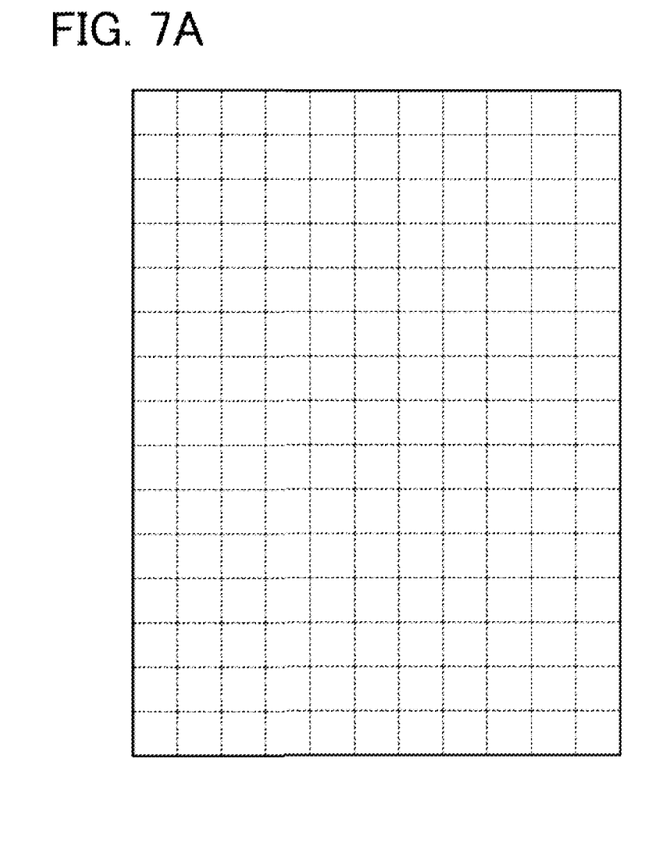
FIG. 7A and FIG. 7B are diagrams illustrating structure examples of the circuit layout generation system.

FIG. 7A illustrates a region where the elements included in the pixel circuit illustrated in FIG. 5 are to be placed, divided in a mesh form. Placing the elements in the region divided in a mesh form enables limitation of the coordinates of the range where the elements are to be placed and a search for the placement of elements, a wiring route, or the like so that the position of elements can be optimized from the initial position.

Figure 7B:
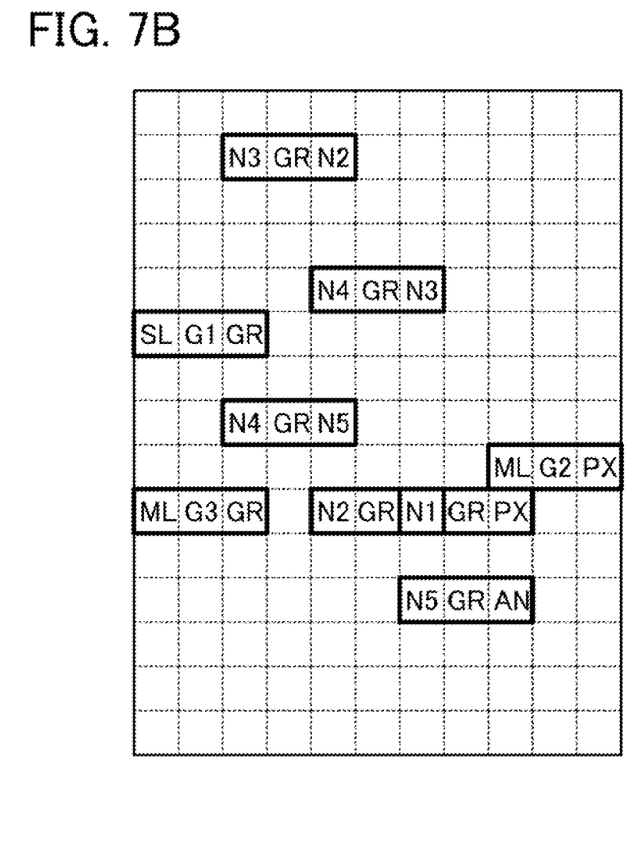

FIG. 7B illustrates a region where the semiconductor layer P42 illustrated in FIG. 6B is placed, in the region divided in a mesh form as illustrated in FIG. 7A. As described above, one embodiment of the present invention has a structure in which, on the basis of the previously supplied limitation conditions and circuit connection data, different limitation conditions are newly generated to also be used to generate layout data. This can suppress the previously supplied limitation conditions and efficiently limit conditions for generating layout data. Note that the number of divisions for the region divided in a mesh form is preferably determined in accordance with the transistor and wiring intervals (design rule). With the structure of determining the placement in the region divided in a mesh form, unnecessary combinations out of automatically generated layout data can be excluded and many possible pixel circuit layouts can be created.

Figure 8A:
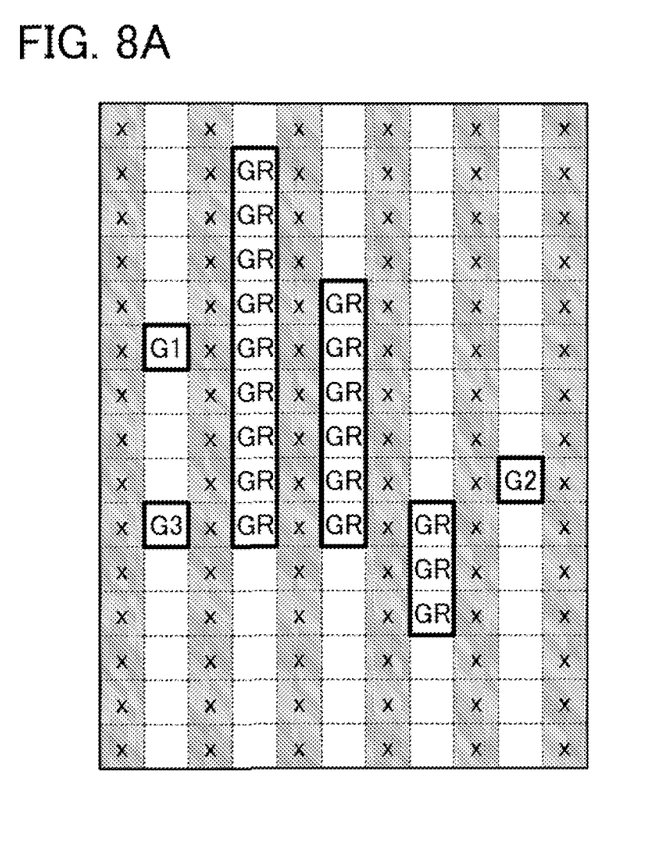
FIG. 8A and FIG. 8B are diagrams illustrating structure examples of the circuit layout generation system.

FIG. 8A illustrates a region where the conductive layer P43 illustrated in FIG. 6B is placed, in the region divided in a mesh form as illustrated in FIG. 7A. In FIG. 8A, the conductive layer P43 is not placed in meshed regions with a mark "×." In the case where a different circuit is stacked below the pixel circuit, a parasitic component with the lower layer needs to be considered.

Figure 8B:
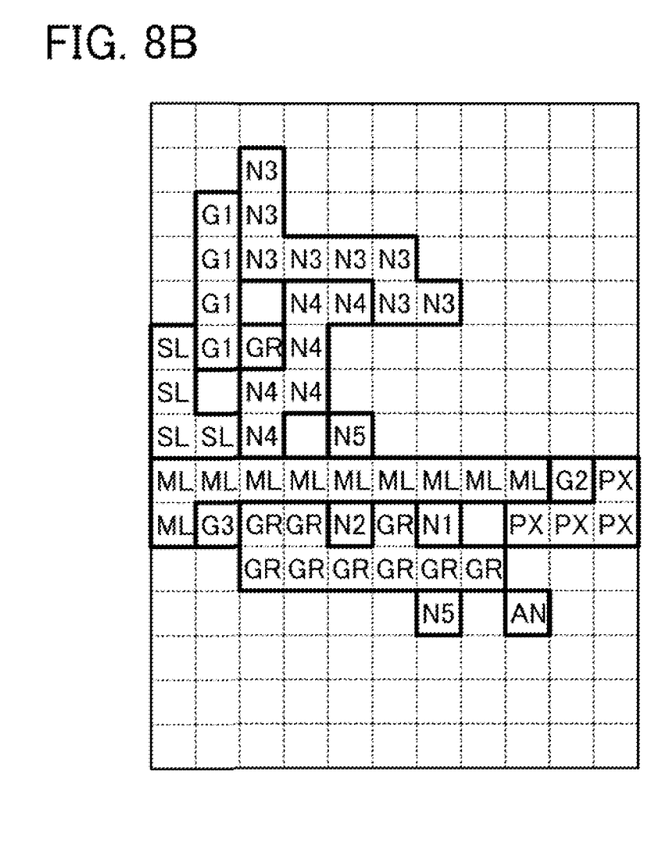

FIG. 8B illustrates a region where the conductive layer P44 illustrated in FIG. 6B is placed, in the region divided in a mesh form as illustrated in FIG. 7A.

Figure 9A:
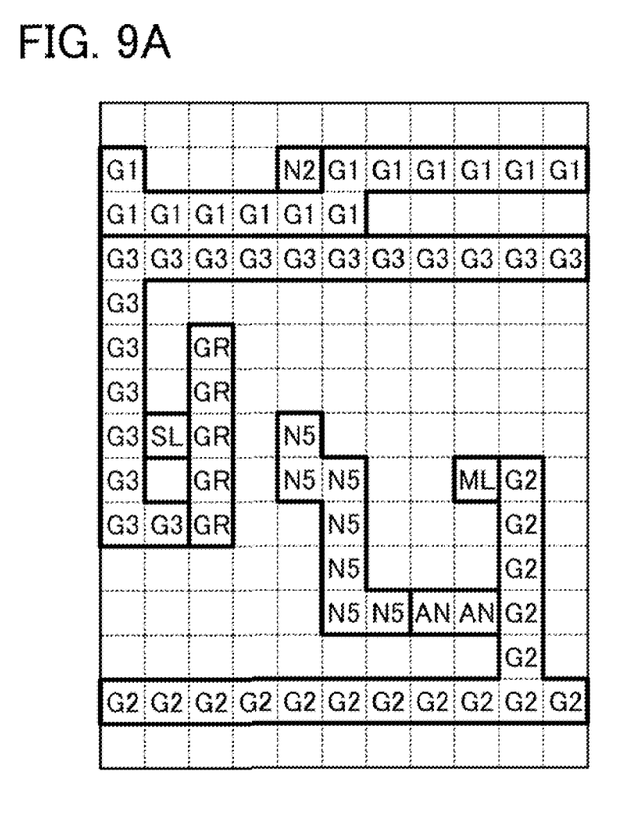
FIG. 9A and FIG. 9B are diagrams illustrating structure examples of the circuit layout generation system.

FIG. 9A illustrates a region where the conductive layer P45 illustrated in FIG. 6B is placed, in the region divided in a mesh form as illustrated in FIG. 7A. Note that a capacitor provided in a region where the wiring layers overlap is preferably made to have as large an area as possible to reduce a parasitic component with a node that varies in potential for the purpose of stabilizing the data potential for displaying an image. Furthermore, the wirings (G1, G2, and G3) have a large signal amplitude and have a large influence on the periphery. Thus, the first limitation conditions preferably include conditions for the placement where parasitic capacitance is not added to a node that is sensitive to a potential change. Moreover, parasitic components of the wirings (G1, G2, and G3) need to be reduced to suppress gate signal distortion. Furthermore, the first limitation conditions preferably include conditions that parasitic capacitance or the like of the node GR is reduced for the retention of the potential.

Figure 9B:
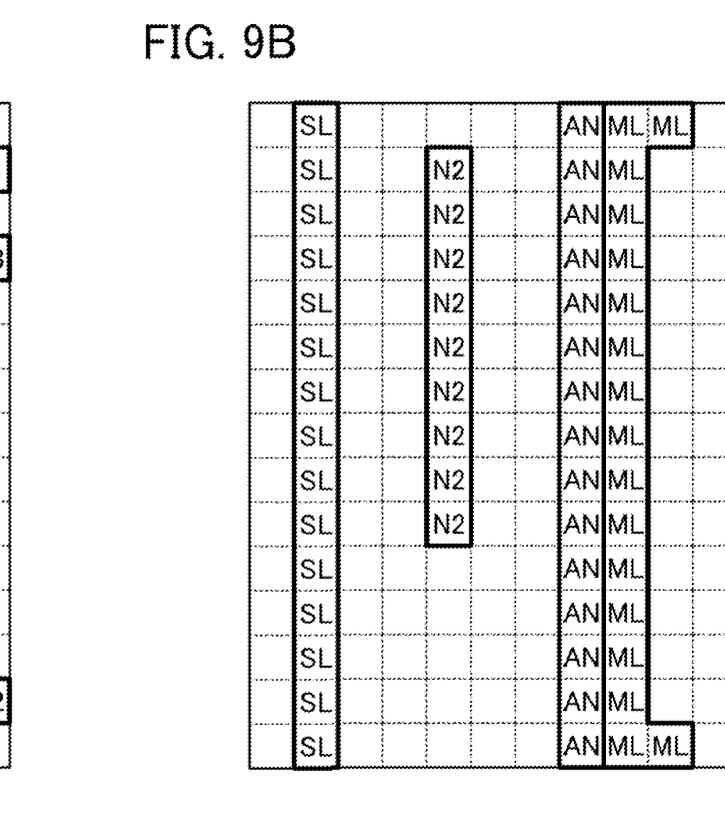

FIG. 9B illustrates a region where the conductive layer P46 illustrated in FIG. 6B is placed, in the region divided in a mesh form as illustrated in FIG. 7A. Since the wiring SL is a wiring for supplying the data signal to the pixel circuit, the first limitation conditions preferably include conditions that parasitic capacitance or the like of the wiring SL is reduced. The same applies to the wiring ML. By contrast, since the wiring AN is a wiring for supplying a fixed potential, a certain amount of potential variation in the wiring AN within a range where the driving transistors operate in the saturation region does not influence the display quality.

Thus, in the case of manually creating the schematic diagrams of FIG. 7A to FIG. 9B regarding the placement of the conductive layers and the semiconductor layer, many parameters should be considered. Therefore, compared with the manual way, the automatic way with the circuit layout generation system or the like allows a search under many conditions and the optimization of the layout data in a short time.

As described above, the circuit layout generation system of one embodiment of the present invention has a structure capable of generating new limitation data with the arithmetic portion; thus, data regarding limitation conditions stored in the memory portion does not need to be increased. Limitation data necessary to generate layout data can be appropriately changed on the basis of the circuit connection data and the limitation data and given to the arithmetic portion. The newly generated limitation data can incorporate a circuit arrangement image a designer had at the time of generating the circuit connection data and can also exclude combinations that might cause improper placement. Therefore, the number of trial operations until the layout data is optimized can be reduced.

In the arithmetic portion of the circuit layout generation system of one embodiment of the present invention, layout data of a pixel circuit can be generated on the basis of circuit connection data and a plurality of pieces of limitation data. Thus, the design period can be shortened compared with the case of creating layout data of the pixel circuit by human hands. Furthermore, labor costs can be reduced. Moreover, the number of trial generations of layout data can be increased, whereby the circuit performance can be optimized.

<Notes on Description of this Specification and the Like>

The following are notes on the description of the foregoing embodiment and the structures in the embodiment.

One embodiment of the present invention can be constituted by appropriately combining the structure described in an embodiment with any of the structures described in the other embodiments. In addition, in the case where a plurality of structure examples are described in one embodiment, the structure examples can be combined with each other as appropriate.

Note that a content (or part thereof) in an embodiment can be applied to, combined with, or replaced with another content (or part thereof) in the same embodiment and/or a content (or part thereof) in another embodiment or other embodiments.

Note that in each embodiment, a content described in the embodiment is a content described with reference to a variety of diagrams or a content described with text disclosed in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be created.

In this specification and the like, components are classified on the basis of the functions and shown as blocks independent of each other in block diagrams. However, in an actual circuit or the like, it may be difficult to separate components on the basis of the functions, so that one circuit may be associated with a plurality of functions or several circuits may be associated with one function, for example. Therefore, the segmentation of a block in the block diagrams is not limited by any of the components described in the specification, and can be differently determined as appropriate depending on situations.

In drawings, the size, the layer thickness, or the region is determined arbitrarily for description convenience. Therefore, the size, the layer thickness, or the region is not limited to the illustrated scale. Note that the drawings are schematically shown for clarity, and an embodiment of the present invention is not limited to shapes or values shown in the drawings. For example, the following can be included: variation in signal, voltage, or current due to noise or difference in timing.

In this specification and the like, the expressions "one of a source and a drain" (or a first electrode or a first terminal) and "the other of the source and the drain" (or a second electrode or a second terminal) are used to describe the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In addition, in this specification and the like, the term such as an "electrode" or a "wiring" does not limit a function of the component. For example, an "electrode" is used as part of a "wiring" in some cases, and vice versa. Moreover, the term "electrode" or "wiring" also includes the case where a plurality of "electrodes" or "wirings" are formed in an integrated manner, for example.

In this specification and the like, voltage and potential can be interchanged with each other as appropriate. The term "voltage" refers to a potential difference from a reference potential. When the reference potential is a ground voltage, for example, "voltage" can be replaced with "potential". The ground potential does not necessarily mean 0 V. Potentials are relative values, and the potential applied to a wiring or the like is changed depending on the reference potential, in some cases.

Note that in this specification and the like, the terms such as "film" and "layer" can be interchanged with each other depending on the case or circumstances. For example, the term "conductive layer" can be changed into the term "conductive film" in some cases. For another example, the term "insulating film" can be changed into the term "insulating layer" in some cases.

In this specification and the like, a switch is in a conduction state (on state) or in a non-conduction state (off state) to determine whether a current flows therethrough or not. Alternatively, a switch has a function of selecting and changing a current path.

In this specification and the like, the channel length refers to, for example, the distance between a source and a drain in a region where a semiconductor (or a portion where a current flows in a semiconductor when a transistor is on) and a gate overlap each other, or a region where a channel is formed in a top view of the transistor.

In this specification and the like, the channel width refers to, for example, the length of a portion where a source and a drain face each other in a region where a semiconductor (or a portion where current flows in a semiconductor when a transistor is on) and a gate electrode overlap each other, or a region where a channel is formed.

In this specification and the like, the expression "A and B are connected" means the case where A and B are electrically connected as well as the case where A and B are directly connected. Here, the expression "A and B are electrically connected" means the case where electric signals can be transmitted and received between A and B when an object having any electric action exists between A and B.

This application is based on Japanese Patent Application Serial No. 2021-108264 filed with Japan Patent Office on Jun. 30, 2021, the entire contents of which are hereby incorporated by reference.

What is claimed is:

1. A circuit layout generation system comprising:
   a memory portion;
   a limitation data arithmetic portion; and
   a layout data arithmetic portion,
   wherein the memory portion is configured to store circuit connection data and first limitation data,
   wherein the limitation data arithmetic portion is configured to generate second limitation data on the basis of the circuit connection data and the first limitation data and store the second limitation data in the memory portion,
   wherein the layout data arithmetic portion is configured to keep generating a new kind of layout data until the generated layout data satisfy all of the circuit connection data, the first limitation data, and the second limitation data,
   wherein the circuit connection data include a list of electronic components, connection information of nodes of the electronic components represented by a circuit diagram, and capacitances of capacitors in the electronic components,
   wherein the first limitation data includes limitations for directions of the electronic components, limitations in coordinates for limiting placement of the electronic components, and conditions of shapes of capacitors in the electronic components,
   wherein the second limitation data includes limitations for a set of electronic components that are connected to a same node, and
   wherein the layout data includes positional information in coordinates of source electrodes, drain electrodes, and gate electrodes of transistors in the electronic components and electrodes of capacitors in the electronic components.

2. A circuit layout generation system comprising:
   a memory portion;
   a limitation data arithmetic portion; and
   a layout data arithmetic portion, wherein the memory portion is configured to store circuit connection data and first limitation data,
wherein the circuit connection data includes a netlist,
wherein the first limitation data includes data that determines intervals of transistors and capacitors,
wherein the limitation data arithmetic portion is configured to generate second limitation data on a basis of the circuit connection data and the first limitation data and store the second limitation data in the memory portion,
wherein the second limitation data is data that determines the placement of electronic components connected to a same wiring so that the electronic components are positioned close to each other,
wherein the layout data arithmetic portion is configured to keep generating a new kind of layout data until the generated layout data satisfy all of the circuit connection data, the first limitation data, and the second limitation data,
wherein the circuit connection data include a list of electronic components, connection information of nodes of the electronic components represented by a circuit diagram, and capacitances of capacitors in the electronic components,
wherein the first limitation data includes limitations for directions of the electronic components, limitations in coordinates for limiting placement of the electronic components, and conditions of shapes of capacitors in the electronic components,
wherein the second limitation data includes limitations for a set of electronic components that are connected to a same node, and
wherein the layout data includes positional information in coordinates of source electrodes, drain electrodes, and gate electrodes of transistors in the electronic components and electrodes of capacitors in the electronic components.

3. A circuit layout generation system comprising:
a memory portion;
a limitation data arithmetic portion; and
a layout data arithmetic portion,
wherein the memory portion is configured to store circuit connection data and first limitation data,
wherein the circuit connection data includes a netlist,
wherein the first limitation data includes data that determines intervals of transistors and capacitors, and data that determines placement coordinates of the transistors and the capacitors,
wherein the limitation data arithmetic portion is configured to generate second limitation data on a basis of the circuit connection data and the first limitation data and store the second limitation data in the memory portion,
wherein the second limitation data is data that determines the placement of the transistors and the capacitors designated by the placement coordinates so that the transistors and the capacitors are positioned close to each other,
wherein the layout data arithmetic portion is configured to keep generating a new kind of layout data until the generated layout data satisfy all of the circuit connection data, the first limitation data, and the second limitation data,
wherein the circuit connection data include a list of electronic components, connection information of nodes of the electronic components represented by a circuit diagram, and capacitances of capacitors in the electronic components, and
wherein the layout data includes positional information in coordinates of source electrodes, drain electrodes, and gate electrodes of transistors in the electronic components and electrodes of capacitors in the electronic components.

4. The circuit layout generation system according to claim 3,
wherein the netlist comprises a pixel circuit and a light-emitting device, and
wherein the pixel circuit is connected to the light-emitting device.

* * * * *